United States Patent
Koors et al.

(10) Patent No.: US 6,434,958 B1
(45) Date of Patent: Aug. 20, 2002

(54) AMBIENT HUMIDITY COMPENSATION METHOD FOR A VEHICLE CLIMATE CONTROL SYSTEM

(75) Inventors: Mark A. Koors, Kokomo, IN (US); Christopher M Puranen, Waterford, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/767,923

(22) Filed: Jan. 24, 2001

(51) Int. Cl.[7] .................. F25B 49/00; F25B 41/00; F25B 1/00; F25D 17/04; G01K 13/00
(52) U.S. Cl. .................. 62/176.1; 62/129; 62/209; 62/227
(58) Field of Search .................. 62/129, 193, 209, 62/176.1, 227; 165/11.1, 202, 230; 236/91 C, 91 E, 91 G; 417/310

(56) References Cited

U.S. PATENT DOCUMENTS

| | | | | |
|---|---|---|---|---|
| 4,024,725 A | * | 5/1977 | Uchida et al. .......... 236/91 G |
| 4,381,549 A | * | 4/1983 | Stamp et al. ............. 165/11.1 |
| 4,583,373 A | * | 4/1986 | Shaw .......................... 417/310 |
| 5,009,076 A | * | 4/1991 | Winslow .................... 62/129 |
| 5,072,597 A | * | 12/1991 | Bromley et al. .......... 236/91 C |
| 5,335,514 A | * | 8/1994 | Hennessee et al. ............ 62/209 |
| 5,743,104 A | * | 4/1998 | Kim et al. ................. 236/91 E |
| 5,775,415 A | * | 7/1998 | Yoshimi et al. ............. 165/202 |
| 5,884,497 A | * | 3/1999 | Kishita et al. ................. 62/193 |
| 6,293,116 B1 | * | 9/2001 | Forrest et al. ............... 165/230 |

* cited by examiner

Primary Examiner—William C. Doerrler
Assistant Examiner—Filip Zec
(74) Attorney, Agent, or Firm—Jimmy L. Funke

(57) ABSTRACT

The control settings of a vehicle climate control system are adjusted in accordance with a relative ambient humidity correction to compensate for variations in relative ambient humidity, and the correction is based on normally measured system operating parameters. The ambient humidity correction value is determined according to a difference between the cooling performance of the system and the ambient heat energy absorbed by the system. The cooling performance of the system is determined during an initial period of vehicle operation based on the time required to reduce the initial evaporator temperature by a predetermined amount. Once steady-state operation of the system is achieved, the cooling performance of the system is determined by the steady-state deviation of the evaporator outlet air temperature from a target temperature of the system. The ambient heat energy absorbed by the system is determined based on the temperature of the ambient air and the flow rate of air through the evaporator.

12 Claims, 4 Drawing Sheets

AMBIENT HUMIDITY COMPENSATION METHOD FOR A VEHICLE CLIMATE CONTROL SYSTEM

TECHNICAL FIELD

This invention relates to a vehicle climate control system, and more particularly to a method of compensating the control for variations in relative ambient humidity.

BACKGROUND OF THE INVENTION

A vehicle automatic climate control system regulates the operation of a conventional refrigeration cycle with the objective of satisfying a desired cabin air temperature (set temperature) selected by the driver. The system typically controls the blower speed, the evaporator air discharge temperature and the air delivery mode, based on the set temperature, calibration tables and various measured parameters, including the ambient air temperature, solar loading, and the actual cabin air temperature. Another parameter that significantly affects the system operation, but which is typically not measured due to cost considerations. is the relative humidity of the ambient air. Thus, although a climate control system may be calibrated to perform well at nominal ambient humidity, the cooling tends to be excessive at lower-than-nominal ambient humidity and insufficient at higher-than-nominal humidity. This occurs because the amount of work that must be performed for given level of system performance includes not only the work required to reduce the temperature of the air, but also the work required to de-humidify the air. Although a humidity sensor could be used to measure the ambient humidity for purposes of compensating the nominal control settings, the sensor would significantly increase system cost. Accordingly what is needed is a method of compensating an automatic climate control system for variations in the ambient humidity in a cost effective manner.

SUMMARY OF THE INVENTION

The present invention is directed to an improved method of control for a vehicle climate control system in which system control settings are adjusted in accordance with an ambient humidity correction value to compensate for variations in relative ambient humidity, and wherein the correction value is determined based on normally measured system operating parameters. In general, the ambient humidity correction value is determined according to a difference between the cooling performance of the system and the ambient heat energy absorbed by the system. According to the invention, the cooling performance of the system is determined during an initial period of vehicle operation based on the time required to reduce the initial evaporator temperature by a predetermined amount. Once steady-state operation of the system is achieved, the cooling performance of the system is determined by the steady-state deviation of the evaporator outlet air temperature from a target temperature of the system. The ambient heat energy absorbed by the system is estimated based on the temperature of the ambient air and the flow rate of air through the evaporator.

BRIEF DESCRIPTION OF THE DRAWINGS

FIG. 3 is an initialization routine carried out at the beginning of a period of vehicle operation; FIG. 4 is a routine for initializing a humidity correction factor during an initial cool-down period of operation; and FIG. 5 is a routine for setting the humidity correction factor during, steady-state operation of the system.

FIG. 6 depicts a minimum evaporator temperature which must be exceeded to initialize the humidity correction factor; FIG. 7 depicts a refrigerant pressure dependent correction term; FIG. 8 depicts an outside air temperature dependent correction term; FIG. 9 depicts a blower speed dependent correction term; and FIG. 10 depicts the relationship between the humidity correction factor and a computed humidity correction index.

DESCRIPTION OF THE PREFERRED EMBODIMENT

Figure 1:
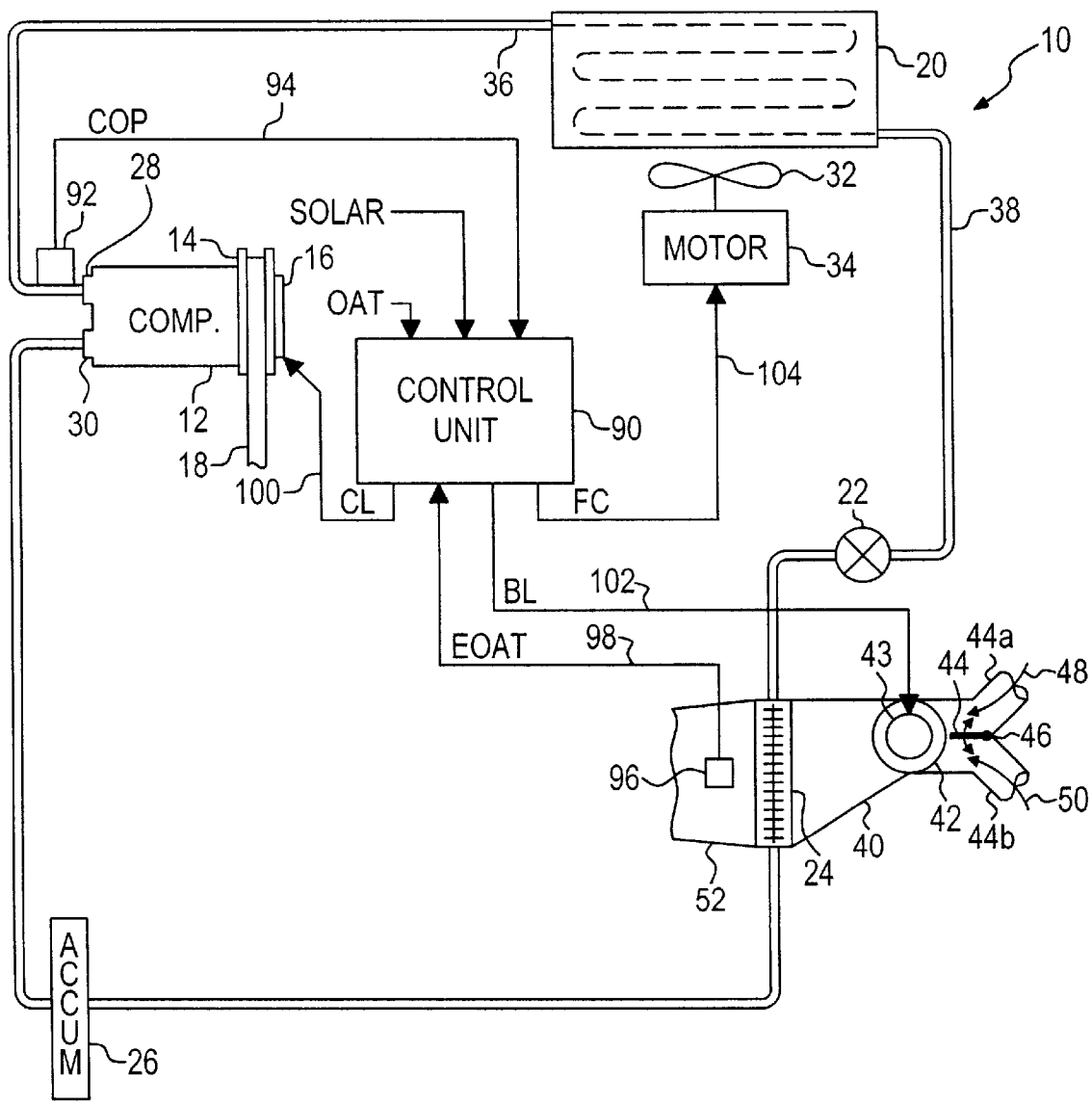
FIG. 1 is a block diagram of a vehicle climate control system according to this invention, including a microprocessor-based control unit.

Referring to FIG. 1, the reference numeral 10 generally designates a vehicle automatic climate control system, including a refrigerant compressor 12 coupled to a drive pulley 14 via an electrically activated clutch 16. In the illustrated embodiment, the compressor 12 has a fixed stroke and is normally cycled on and off during operation of the system 10. However, it should be understood that the present invention is not limited to fixed stroke compressor systems, and that it also applies to systems incorporating variable stroke compressors in which the compressor capacity is adjusted in lieu of cycling the compressor clutch. The pulley 14 is coupled to a rotary shaft of the vehicle engine (not shown) via drive belt 18, and the clutch 16 is selectively engaged or disengaged to turn the compressor 12 on or off. respectively. The system 10 further includes a condenser 20, an orifice tube 22, an evaporator 24, and an accumulator/dehydrator 26 arranged in order between the compressor discharge port 28 and suction port 30. A cooling fan 32, operated by an electric drive motor 34 (or alternately, driven by the engine through a belt arrangement), is controlled to provide supplemental air flow through the condenser 20 for removing heat from the refrigerant therein. The orifice tube 22 allows the cooled high pressure refrigerant in conduit 38 to expand in an isenthalpic process before passing through the evaporator 24. The accumulator/dehydrator 26 separates low pressure gaseous and liquid refrigerant. directs a gaseous portion to the compressor suction port 30, and acts as a reservoir for the reserve refrigerant charge. In an alternative system configuration, the orifice tube 22 is replaced with a thermostatic expansion valve (TXV); in this case, the accumulator/dehydrator 26 is omitted, and a receiver/drier (R/D) is inserted in conduit 38 upstream of the TXV to ensure that sub-cooled liquid refrigerant is supplied to the inlet of the TXV.

The evaporator 24 is formed as an array of finned refrigerant conducting tubes, and an air intake duct 40 disposed on one side of evaporator 24 houses an inlet air blower 42 driven by an electric blower motor 43 to force air past the evaporator tubes. The duct 40 is bifurcated upstream of the blower 42. and an inlet air control door 44 pivoted at point 46 is adjustable as shown to control inlet air mixing; depending on the door position, outside air may enter blower 42 through duct leg 44a as indicated by arrow 48, and passenger compartment air may enter blower 42 through duct leg 44b as indicated by arrow 50. An air outlet duct 52 disposed on the downstream side of blower 42 and evaporator 24 directs the air to one or more passenger compartment outlets.

The system 10 is controlled by the microprocessor-based control unit 90 based on various inputs. In the illustrated embodiment, such inputs include: operator set temperature T_SET (not shown), compressor outlet pressure COP, evaporator outlet air temperature EOAT, outside air temperature OAT and solar loading SOLAR. The compressor outlet pressure COP is detected by a pressure sensor 92 that is coupled to conduit 36 near the compressor discharge port 28, and that produces an electrical representation of the sensed pressure on line 94. Likewise, the evaporator outlet air temperature EOAT is detected by a temperature sensor 96 disposed at the air outlet of evaporator 24, and that produces an electrical representation of the sensed temperature on line 98. Other inputs not shown in FIG. 1 include the manual override controls for fan and mode.

In response to the above-mentioned inputs, the control unit 90 develops output signals for controlling the compressor clutch 16, the fan motor 34, the blower motor 43. and the air control door 44. In FIG. 1, the output signal CL for the clutch 16 appears on line 100, the output signal BL for blower motor 43 appears on line 102. and the Output signal FC for the condenser blower motor 34 appears on line 104. the output signal and actuator for the air control door 44 has been omitted for simplicity.

Figure 2:
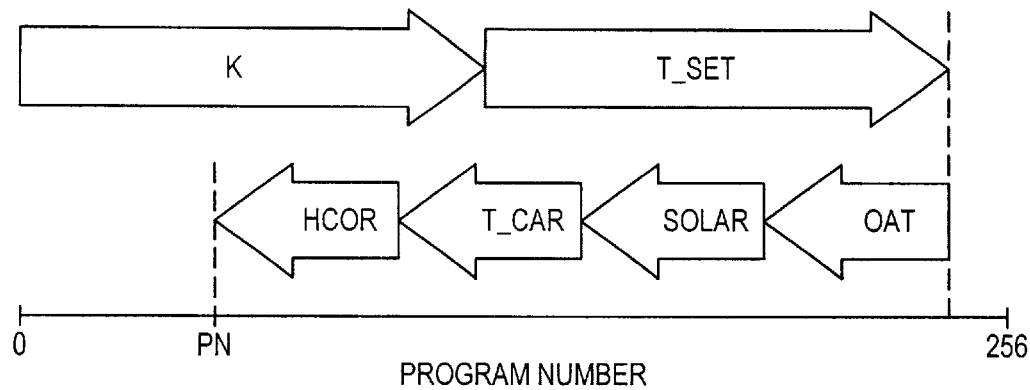
FIG. 2 is a diagram illustrating a climate control technique employed by the control unit of FIG. 1.

The control of the present invention is illustrated in the context of a climate control system in which the blower speed,. evaporator discharge temperature and mode are scheduled as a predetermined function of a program number PN determined as a combined function of operator set temperature T_SET, outside air temperature OAT, solar loading SOLAR, and cabin temperature T_CAR. According to the present invention, the program number PN is also determined as a function of a humidity correction factor HCOR. The relationship among these variables is schematically depicted in FIG. 2, which illustrates that the program number PN is determined according to the sum of T_SET and a calibrated constant K, less the sum of OAT, SOLAR, T_CAR and HCOR. As indicated on the horizontal axis of FIG. 2, increasingly lower values of program number PN correspond to increased cooling demand, and increasingly higher values of program number PN correspond to increased heating demand. In the illustrated embodiment, the constant K is calibrated to provide good cooling performance at low ambient humidity, and the humidity correction factor HCOR has a value that increases with increasing ambient humidity above the calibration level. Thus, the humidity correction factor HCOR reduces the value of the program number PN in relation to the amount by which the detected ambient humidity exceeds the calibration humidity, thereby increasing the cooling performance of the system at higher levels of ambient humidity.

Figure 5:
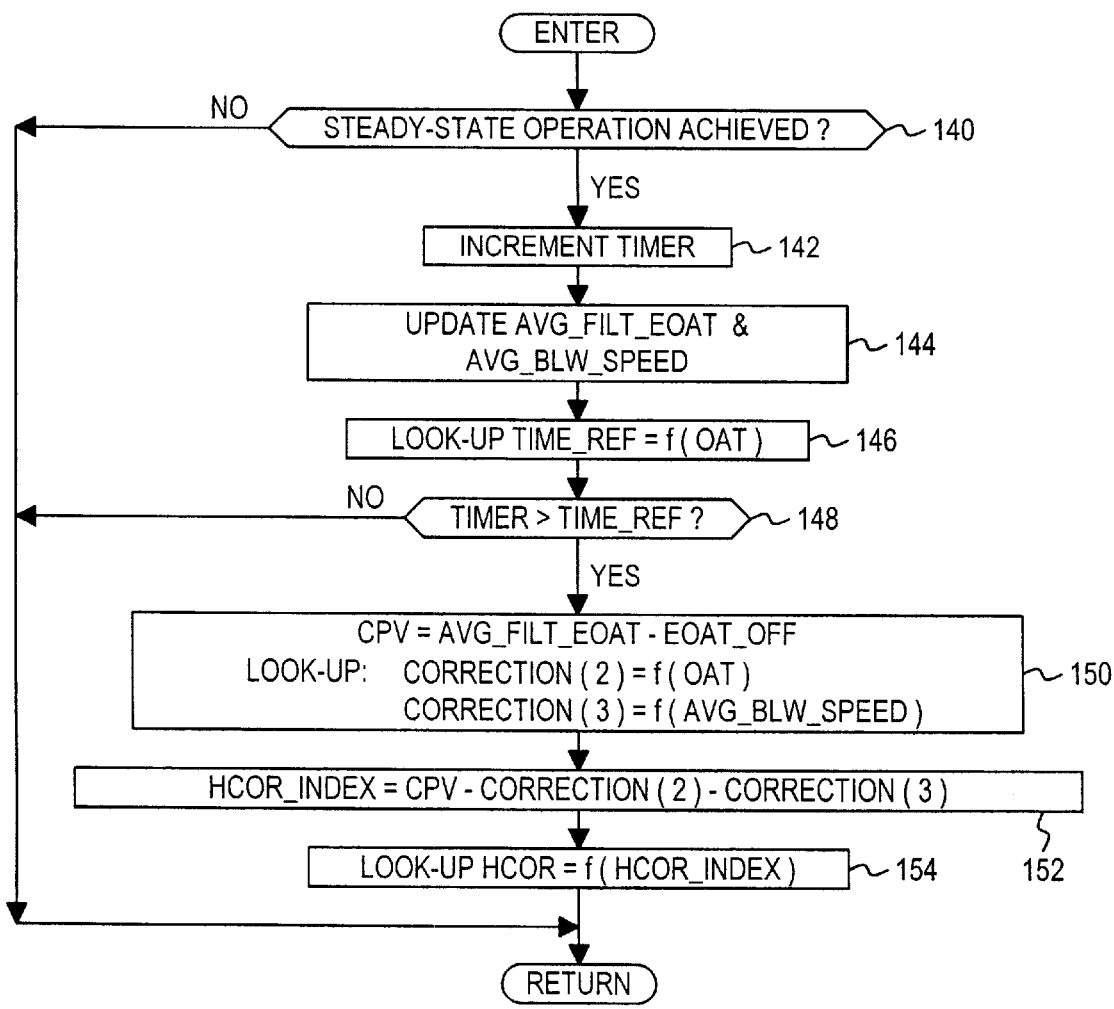
FIGS. 3–5 are flowcharts representing software routines executed by the control unit of FIG. 1 in carrying out the control of this invention.
Figure 3:
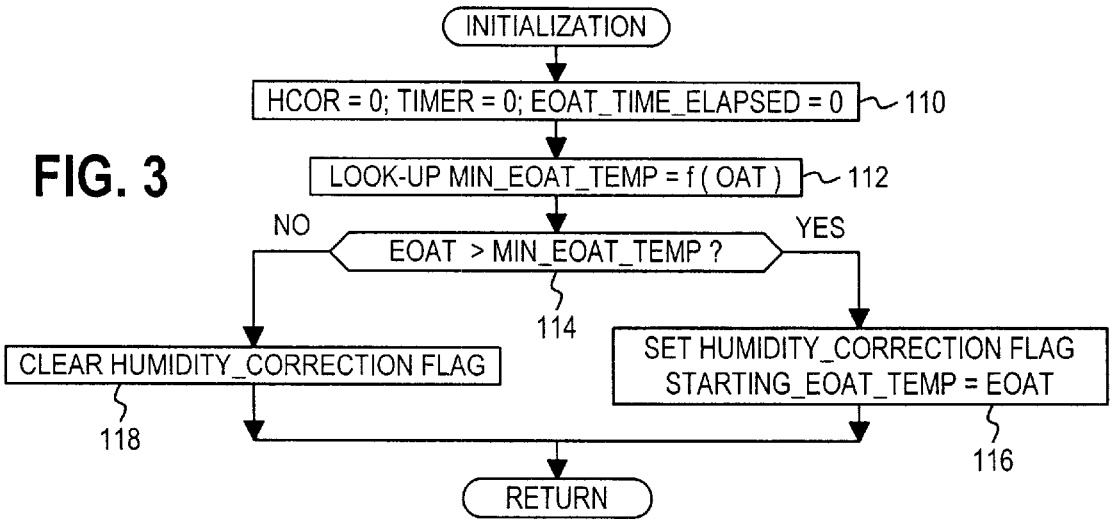
Figure 4:
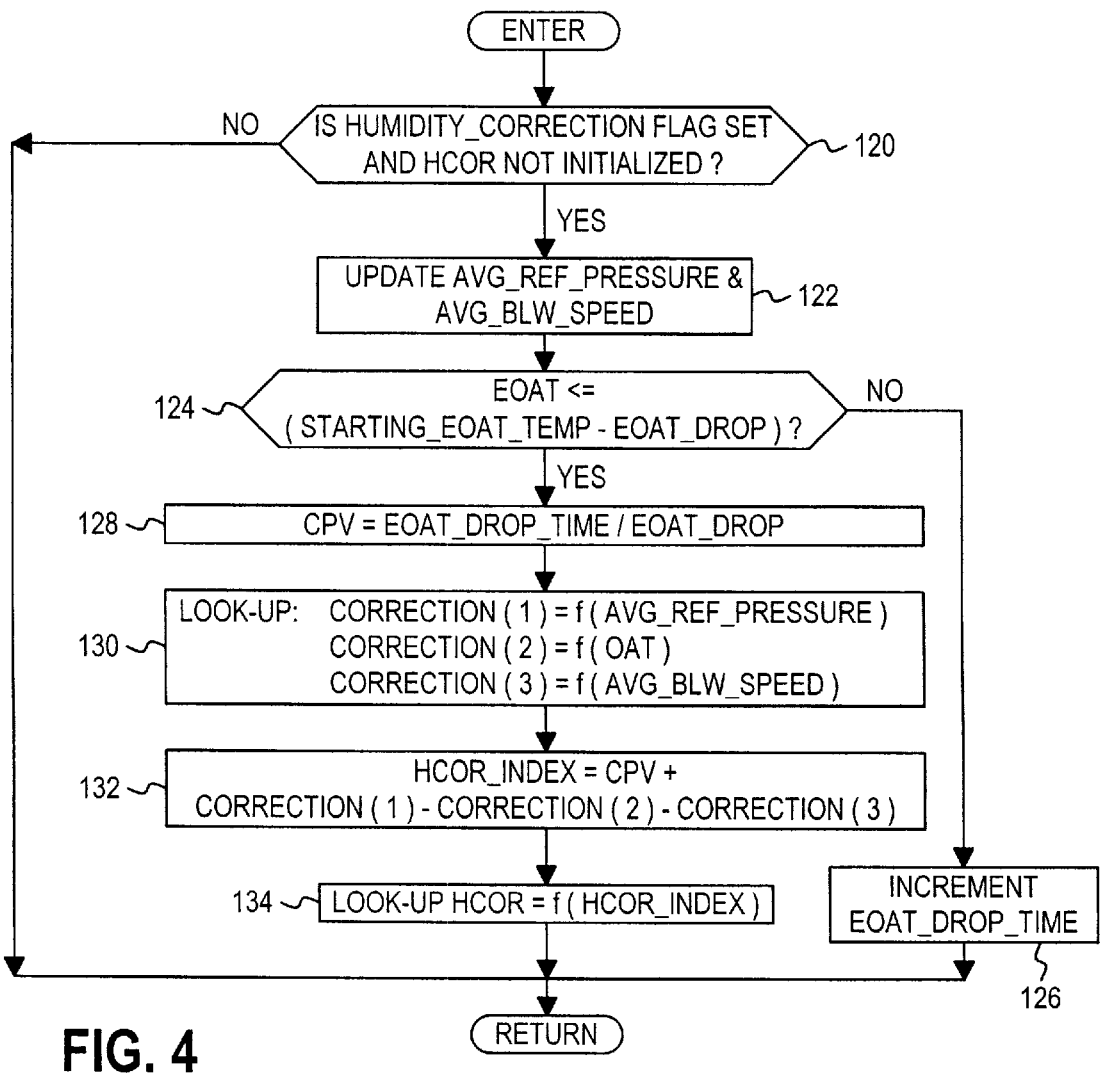

The method of determining the humidity correction factor HCOR is illustrated by the flow diagrams of FIGS. 3, 4 and 5, which represent software routines performed by the control unit 90 of FIG. 1. FIG. 3 depicts an initialization routine executed at the beginning of each period of vehicle operation, whereas FIGS. 4 and 5 depict routines executed periodically in the course of the ensuing vehicle operation. The routine of FIG. 4 determines the value of HCOR during an initial period of system operation. and the routine of FIG. 5 updates HCOR once the system reaches a steady-state operating mode.

Figure 6:
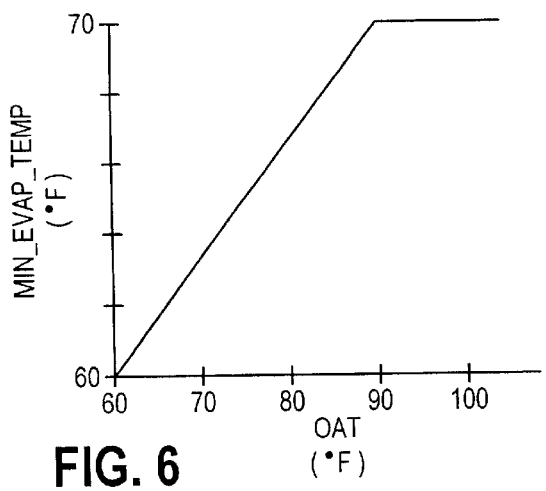
FIGS. 6–10 graphically depict various look-up functions set forth in the flow diagrams of FIGS. 4–5.

The initialization routine of FIG. 3 establishes initial variable states and determines if humidity correction should be enabled. For example, the block 110 sets the humidity correction term HCOR and various timers to zero. Blocks 112 and 114 determine whether humidity correction should be enabled by establishing a minimum evaporator temperature reference (MIN_EOAT_TEMP) and determining if the initial value of EOAT exceeds MIN_EOAT_TEMP. As indicated in the graph of FIG. 6, the reference temperature MIN_EOAT_TEMP generally increases with increasing outside air temperature OAT. If EOAT exceeds MIN_EOAT_TEMP, a significant reduction in EOAT is likely to occur in the ensuing operation of the climate control system 10. As explained below in reference to FIG. 4, the initial reduction in EOAT is used (along with other parameters) to establish an initial value for HCOR. Thus, if EOAT exceeds MIN_EOAT_TEMP, humidity correction is enabled, and block 116 is executed to set the HUMIDITY CORRECTION flag and to set the variable STARTING_EOAT_TEMP equal to the initial EOAT value. If EOAT≦MIN_EOAT_TEMP, humidity correction is not enabled, and block 118 is executed to clear the HUMIDITY_CORRECTION flag.

As indicated above, the routine of FIG. 4 determines an initial value of HCOR once humidity correction is enabled by measuring the time required to achieve a predetermined initial reduction in EOAT. Thus, block 120 initially determines if the HUMIDITY_CORRECTION flag is set and HCOR has not already been initialized. Thus, the remainder of the routine will be periodically executed as soon as the HUMIDITY_CORRECTION flag has been set, and will cease being executed when the initial value of HCOR has been established. Once block 122 has been answered in the affirmative, the block 124 begins averaging the readings of the high side refrigerant pressure (COP) and the blower motor speed (BLW_SPEED). The blower motor speed BLW_SPEED may be a measured quantity. but in the illustrated embodiment. it is simply the commanded blower motor speed BL (which may be represented by a speed command or a PWN duty cycle command). Algebraically. the average refrigerant pressure (AVG_REF_PRESSURE) and the average blower motor speed (AVG_BLW_SPEED) may be expressed as follows:

$$AVG\_REF\_PRESSURE = AVG\_REF\_PRESSURE + K1(COP_1 - AVG\_REF\_PRESSURE) \quad (1)$$

$$AVG\_BLW\_SPEED = AVG\_BLW\_SPEED + K2(BLW\_SPEED - AVG\_BLW\_SPEED) \quad (2)$$

where K1 and K2 are gain terms and $COP_f$ is a low-pass filtered version of COP. Block 124 then compares EOAT with the difference (STARTING_EOAT_TEMP−EOAT_DROP), where EOAT_DROP is a calibrated temperature drop, such as 20° F., for example. Prior to achieving the requisite temperature drop, the block 126 is executed to increment a timer value EOAT_DROP_TIME, and the remainder of the routine is skipped. However, once the requisite temperature drop has occurred, the blocks 128, 130, 132 and 134 are executed to determine the initial value of HCOR. The block 128 computes a cooling performance value CPV based on EOAT_DROP_TIME as follows:

$$CPV = (EOAT\_DROP\_TIME / EOAT\_DROP) \quad (3)$$

Figure 7:
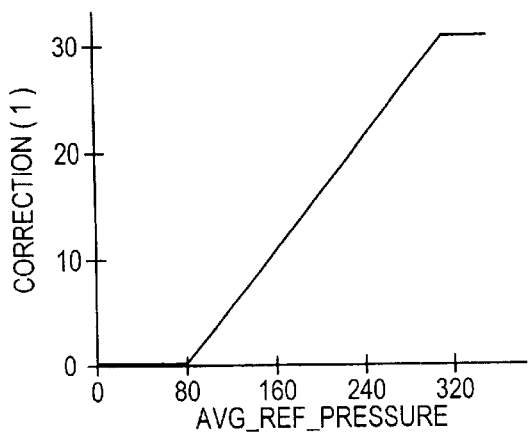

The computed cooling performance value CPV, once corrected for variations in high side refrigerant pressure, represents a first major component of the work performed by the climate control system 10—lowering the temperature of the ambient air. Thus, block 130 determines a refrigerant pressure dependent correction term CORRECTION(1), which increases the cooling performance value with increasing high side refrigerant pressure COP. As indicated by block 130 and the graph of FIG. 7, CORRECTION(1) is determined by table-lookup, and generally increases with increasing refrigerant pressure (as represented by AVG_REF_PRESSURE).

Figure 8:
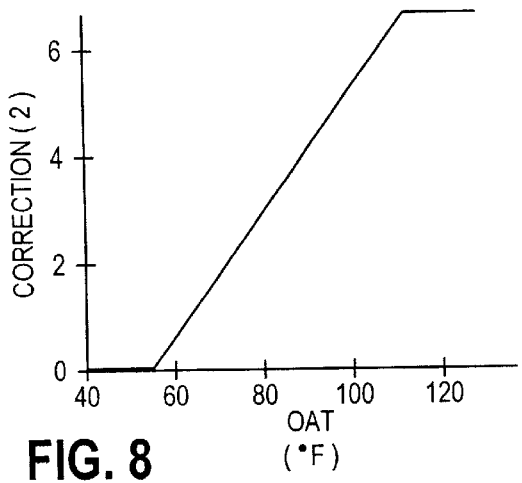
Figure 9:
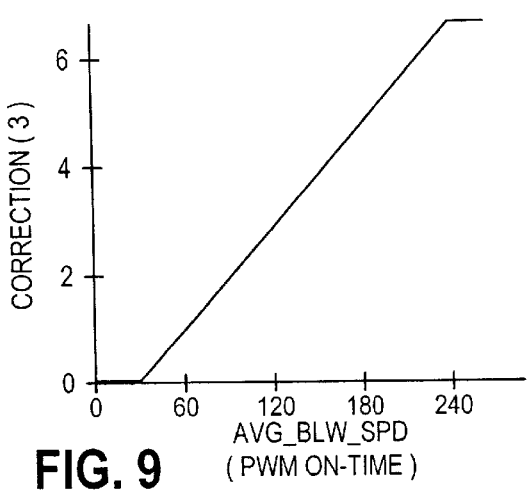

The remaining correction terns determined at block 130 (CORRECTION(2) and CORRECTION(3)) represent the energy absorbed on the upstream or "wet" side of evaporator 24. The correction term CORRECTION(2) represents the energy associated with overcoming high ambient air temperature, and generally increases with OAT above a given level, as depicted in the graph of FIG. 8. The correction term CORRECTION(3) represents the heat energy absorbed by evaporator 24, and generally increases with AVG_BLW_SPEED above a given level, as depicted in the graph of FIG. 9. An indication of the relative ambient humidity, in turn, is given by the difference between the refrigerant-pressure-corrected cooling performance value (that is, CPV+CORRECTION(1)) and the sum of CORRECTION(2) and CORRECTION(3). Thus, as indicated at block 132, the terms CPV, CORRECTION(1), CORRECTION(2) and CORRECTION(3) are combined to form a humidity correction index (HCOR INDEX), as follows:

$$HCOR\_INDEX=[CPV+CORRECTION(1)]-[CORRECTION(2)+CORRECTION(3)]. \quad (4)$$

Figure 10:
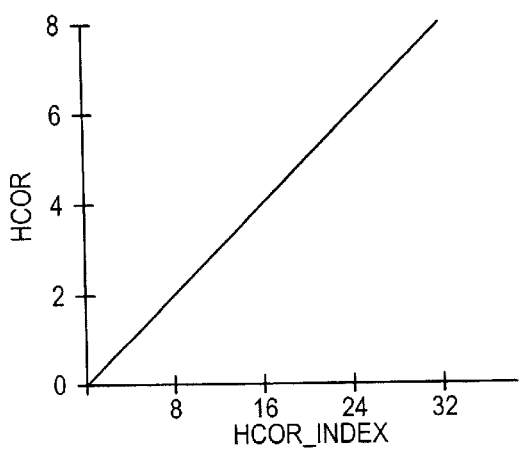

Finally, block 134 converts HCOR_INDEX to an initial humidity correction term HCOR. In the illustrated embodiment, this is also achieved by table-lookup, with exemplary data being depicted in the graph of FIG. 10.

Of course, the look-up table data depicted in FIGS. 6–10 may be replaced with corresponding mathematical expressions, if desired. Nevertheless, the illustrated mechanization is preferred because it facilitates calibration of the humidity correction for a particular system and vehicle.

As indicated above, the routine of FIG. 5 updates the humidity correction term HCOR once the system 10 reaches a steady-state or quasi-steady-state operating mode. Thus, block 140 initially determines if steady-state operation has been achieved. In the illustrated mechanization, this may be indicated by the commencement of compressor clutch cycling; in other mechanizations, it may be indicated when a certain pattern of compressor capacity control is detected. Once block 140 is answered in the affirmative. the blocks 142–154 are periodically executed to update HCOR. The block 142 increments the previously initialized TIMER, and block 144 updates AVG_BLW_SPEED (using equation (2), for example), and begins averaging the readings of the evaporator outlet air temperature (EOAT). Similar to equations (1) and (2), the average evaporator outlet temperature AVG_FILT_EOAT may be determined algebraically as follows:

$$AVG\_FILT\_EOAT=AVG\_FILT\_EOAT+K3(EOAT_1-AVG\_FILT\_EOAT) \quad (5)$$

where K3 is a gain term and $EOAT_f$ is a low-pass filtered version of EOAT. Updating of AVG FILT EOAT is preferably suspended when the vehicle speed is less than a reference value so that AVG_FILT_EOAT represents the average evaporator outlet temperature with adequate airflow across condenser 20. Block 146 then determines a time reference TIME_REF for comparison with TIMER. The time reference TIME_REF is preferably dependent on outside air temperature OAT, and generally increases with increasing values of OAT so that TIMER will not reach TIME_REF until AVG_FILT_EOAT has achieved a relatively steady value. In the illustrated embodiment, a similar functionality could be achieved by waiting until compressor 12 has been cycled on and off at least a predetermined number of times. Once TIMER reaches or exceeds TIME_REF, as determined at block 148, the blocks 150, 152 and 154 are executed to update HCOR in a manner analogous to that described above in respect to the flow diagram of FIG. 4. The block 150 computes the cooling performance value CPV based on a difference between the average and target evaporator temperatures as follows:

$$CPV=AVG\_FILT\_EOAT\_EOAT\_OFF \quad (6)$$

where EOAT_OFF is the evaporator outlet air target temperature at which the control unit 90 cycles compressor clutch 16 from on to off. Thus. in steady-state operation, the cooling performance value CPV is determined according to a measure of the steady-state temperature error of the system 10. In some systems, EOAT_OFF is equivalent to the program number-dependent discharge temperature; in other systems, EOAT_OFF may be a fixed or nearly fixed value, in which case, the discharge temperature is controlled by re-heating the evaporator outlet air. Block 150 also determines outside air temperature and blower speed dependent correction values CORRECTION(2) and CORRECTION(3) as described above in reference to FIGS. 4, 8 and 9. Block 152 then combines the terms CVP, CORRECTION(2) and CORRECTION(3) to update the humidity correction index (HCOR_INDEX), as follows:

$$HCOR\_INDEX=CVP-[CORRECTION(2)+CORRECTION(3)] \quad (7)$$

Finally, block 154 converts HCOR_INDEX to a corresponding humidity correction term HCOR as described above in reference to FIGS. 4 and 10, completing the routine.

In summary,. the control of the present invention provides a cost effective method of compensating the operation of a vehicle climate control system for variations in ambient relative humidity by adjusting a control setting in accordance with a humidity indication derived from normally measured operating parameters of the system. While the invention has been described in reference to the illustrated embodiment, it is expected that various modifications in addition to those mentioned above will occur to those skilled in the art. Thus, it will be understood that methods incorporating these and other modifications may fall within the scope of this invention, which is defined by the appended claims.

What is claimed is:

1. A method of operation for a vehicle climate control system including a compressor for producing compressed refrigerant which is expanded and delivered to an evaporator for cooling and de-humidifying ambient air flowing therethrough, the operation of the system being governed in accordance with control settings based at least in part on operator demand, the method comprising the steps of:

determining a cooling performance value indicative of an ability of the system to cool said ambient air;

estimating an energy absorption value indicative of ambient heat energy absorbed by said system;

determining an ambient humidity correction value according to a difference between the cooling performance value and the energy absorption value; and adjusting said control settings based on the ambient humidity correction value to thereby compensate the operation of the system for variation in relative humidity of the ambient air.

2. The method of operation of claim 1, including the steps of:

measuring a time required to initially reduce a temperature of said evaporator by a predetermined amount; and initializing said cooling performance value in accordance with the measured time.

3. The method of operation of claim 2, including the steps of:

determining a minimum temperature reference based on a temperature of said ambient air; and disabling the step of initializing said cooling performance value if an initial temperature of said evaporator is less than said minimum temperature reference.

4. The method of operation of claim 3, wherein said minimum temperature reference increases with increasing temperature of said ambient air.

5. The method of operation of claim 2, including the steps of:

measuring a pressure of the refrigerant produced by said compressor;

determining a compensation value based on the measured pressure of said refrigerant; and adjusting said cooling performance value based on said compensation value.

6. The method of operation of claim 5, wherein said compensation value increases with increasing measured refrigerant pressure above a reference pressure.

7. The method of operation of claim 1, wherein said compressor is controlled to achieve a target temperature of said evaporator, and the method includes the steps of:

detecting a steady-state operation of said system; and when said steady-state operation has been detected:

computing a running average temperature of said evaporator; and periodically updating said cooling performance value based on a deviation of said running average temperature from said target temperature.

8. The method of operation of claim 7, wherein the step of computing a running average temperature of said evaporator comprises the steps of:

updating said running average temperature based on a current measure of the evaporator temperature; and suspending the updating of said running average temperature when a vehicle speed falls below a reference value.

9. The method of operation of claim 1, including the steps of:

determining a first energy absorption value based on a temperature of said ambient air;

determining a second energy absorption value based on a flow rate of ambient air through said evaporator; and estimating said energy absorption value according to a sum of said first and second energy absorption values.

10. The method of operation of claim 9, wherein the first energy absorption value increases with increasing ambient air temperature above a reference temperature.

11. The method of operation of claim 9, wherein the second energy absorption value increases with increasing ambient air flow rate above a reference flow rate.

12. The method of operation of claim 9, wherein the system includes a blower motor for forcing ambient air through said evaporator, and the method of operation includes the step of:

determining the ambient air flow rate according to a commanded speed of said blower motor.

\* \* \* \* \*